United States Patent
Li

(10) Patent No.: US 12,470,357 B2
(45) Date of Patent: Nov. 11, 2025

(54) DATA TRANSMISSION PROCESSING METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd, Beijing (CN)

( * ) Notice: Subject to any disclaimer, the term of this patent is extended or adjusted under 35 U.S.C. 154(b) by 381 days.

(21) Appl. No.: 17/925,220

(22) PCT Filed: May 15, 2020

(86) PCT No.: PCT/CN2020/090621
§ 371 (c)(1),
(2) Date: Nov. 14, 2022

(87) PCT Pub. No.: WO2021/227049
PCT Pub. Date: Nov. 18, 2021

(65) Prior Publication Data
US 2023/0188303 A1    Jun. 15, 2023

(51) Int. Cl.
*H04B 7/06* (2006.01)
*H04L 5/00* (2006.01)
*H04W 72/044* (2023.01)

(52) U.S. Cl.
CPC ......... *H04L 5/0091* (2013.01); *H04B 7/0639* (2013.01); *H04L 5/0048* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 10,999,745 B2 * | 5/2021 | Yang | H04L 27/2602 |
| 2018/0323855 A1 | 11/2018 | Noh et al. | |
| 2019/0349059 A1 | 11/2019 | John Wilson et al. | |
| 2020/0313827 A1 * | 10/2020 | Noh | H04B 7/0695 |
| 2023/0188286 A1 * | 6/2023 | Yokomakura | H04L 5/0051 |
| | | | 370/329 |

FOREIGN PATENT DOCUMENTS

| | | |
|---|---|---|
| CN | 107889256 A | 4/2018 |
| CN | 109104765 A | 12/2018 |

(Continued)

OTHER PUBLICATIONS

3GPP TS 38.214 V15.9.0 (Mar. 2020) 6.2.1 (Year: 2020).*

(Continued)

*Primary Examiner* — Luna Weissberger
(74) *Attorney, Agent, or Firm* — Volpe Koenig

(57) ABSTRACT data transmission processing method, includes: receiving configuration information sent by a base station, the configuration information carrying sounding reference signal (SRS) resource configuration information; with regard to one SRS resource, the configuration information being used for indicating L pieces of target beam information, L being a positive integer greater than 1; and sending the SRS in beam directions indicated by the L pieces of target, beam information.

20 Claims, 7 Drawing Sheets

(56) References Cited

FOREIGN PATENT DOCUMENTS

| CN | 109152005 A | 1/2019 | | |
|---|---|---|---|---|
| CN | 110235496 A | 9/2019 | | |
| CN | 110637495 A | 12/2019 | | |
| CN | 110912665 A | 3/2020 | | |
| CN | 110945822 A | 3/2020 | | |
| CN | 110945944 A | 3/2020 | | |
| EP | 3614766 A1 | 2/2020 | | |
| WO | 2020001532 A1 | 1/2020 | | |
| WO | WO-2020057383 A1 * | 3/2020 | ............... | H04L 5/00 |

OTHER PUBLICATIONS

Research on beamforming of new wireless access technology NR-MIMO (2019).
Keysight Technologies UKLtd, "Beamcorrespondence—SRSconfiguration correctionsin annex K.1.1", 3GPP TSG-RAN5 Meeting #87-e,R5-202027, Electronic Meeting, May 18-29, 2020.
Huawei, HiSilicon, "UL SRS design for beam management, CSIacquisition", 3GPP TSG RAN WG1 Meeting #89,R1-1706938, Hangzhou, China, May 15-19, 2017.
Chinese Notice of Allowance issued on Jul. 28, 2023 for Chinese Patent Application No. 202080000986.6.
Chinese Supplementary Search Report issued on Jul. 26, 2023 for Chinese Patent Application No. 202080000986.6.
3GPP Draft; R1-1612491 NR SRS, Nov. 4, 2016, 3rd Generation Partnership Project (3GPP), Mobile Competence Centre, 650, route des Lucioles, F-06921 Sophia-Antipolis Cedex, France.

* cited by examiner

DATA TRANSMISSION PROCESSING METHOD AND APPARATUS, COMMUNICATION DEVICE AND STORAGE MEDIUM

CROSS REFERENCE TO RELATED APPLICATION

The present application is a U.S. National Stage of International Application No. PCT/CN2020/090621, filed on May 15, 2020, the contents of all of which are incorporated herein by reference in their entireties for all purposes.

BACKGROUND

In New Radio (NR) technology, when the communication frequency band is within Frequency Range (FR) 2, the FR2 is a high frequency band. Because of the fast attenuation of the high frequency channel, in order to ensure the coverage, data transmission is usually performed based on beams.

SUMMARY

The disclosure relates to, but not limited to, the field of radio communication, and in particular relates to a data transmission processing method and apparatus, communication device and a storage medium.

Examples of the disclosure disclose a data transmission processing method and apparatus, a communication device and a storage medium.

A first aspect of the examples of the disclosure provides a data transmission processing method, applied to a user equipment (UE), including:
  receiving configuration information sent by a base station, the configuration information carrying sounding reference signal (SRS) resource configuration information: with regard to one SRS resource, the configuration information being used for indicating L pieces of target beam information, L being a positive integer greater than 1; and
  sending the SRS in beam directions indicated by the L pieces of target beam information.

A second aspect of the examples of the disclosure provides a data transmission processing method, applied to a base station, including:
  sending configuration information to a user equipment (UE), the configuration information carrying sounding reference signal (SRS) resource configuration information; with regard to one SRS resource, the configuration information being used for indicating L pieces of target beam information, L being a positive integer greater than 1; and
  receiving the SRS sent by the UE in beam directions indicated by the L pieces of target beam information.

A third aspect of the examples of the disclosure provides a communication device, including:
  a processor; and
  a memory for storing a processor executable instruction.

The processor is configured to implement the data transmission processing method according to any example of the disclosure when executing the executable instruction.

A fourth aspect of the examples of the disclosure provides a computer storage medium. The computer storage medium stores a computer executable program. The executable program implements the data transmission processing method according to any example of the disclosure when being executed by a processor.

DETAILED DESCRIPTION

The examples will be described in detail here, and corresponding instances are shown in the accompanying drawings. When the following description involves the accompanying drawings, unless otherwise indicated, the same numbers in different drawings indicate the same or similar elements. The implementations described in the following examples do not represent all implementations consistent with the examples of the disclosure. Rather, they are merely examples of apparatuses and methods consistent with some aspects of the examples of the disclosure as described in detail in the appended claims.

The terms used in the examples of the disclosure are only for the purpose of describing specific examples, and are not intended to limit the examples of the disclosure. The singular forms "a", "said" and "the" used in the examples of the disclosure and the appended claims are also intended to include plural forms, unless the context clearly indicates otherwise. It is to be understood that the term "anchor" as used here refers to and includes any or all possible combinations of one or more associated listed items.

It is to be understood that although the terms first, second, third, etc., may be used in the examples of the disclosure to describe various information, the information is not limited to these terms. These terms are only used to distinguish the same type of information from each other. For example, without departing from the scope of the examples of the disclosure, the first information may also be referred to as the second information, and similarly, the second information may also be referred to as the first information. Depending on the context, the word "if," as used here, can be interpreted as "when," "while," or "in response to determining."

In New Radio (NR) technology, when the communication frequency band is within Frequency Range (FR) 2, the FR2 is a high frequency band. Because of the fast attenuation of the high frequency channel, in order to ensure the coverage, data transmission is usually performed based on beams.

However, at present, only one beam direction for sending beams is configured for the sounding reference signal (SRS) resource. As a result, when a user equipment (UE) has a plurality of antenna panels or transmission reception points (TRPs), how to configure the UE to send the SRS by using the plurality of antenna panels or TRPs to improve the SRS transmission efficiency is an urgent problem to be solved in terms of beam direction.

Figure 1:
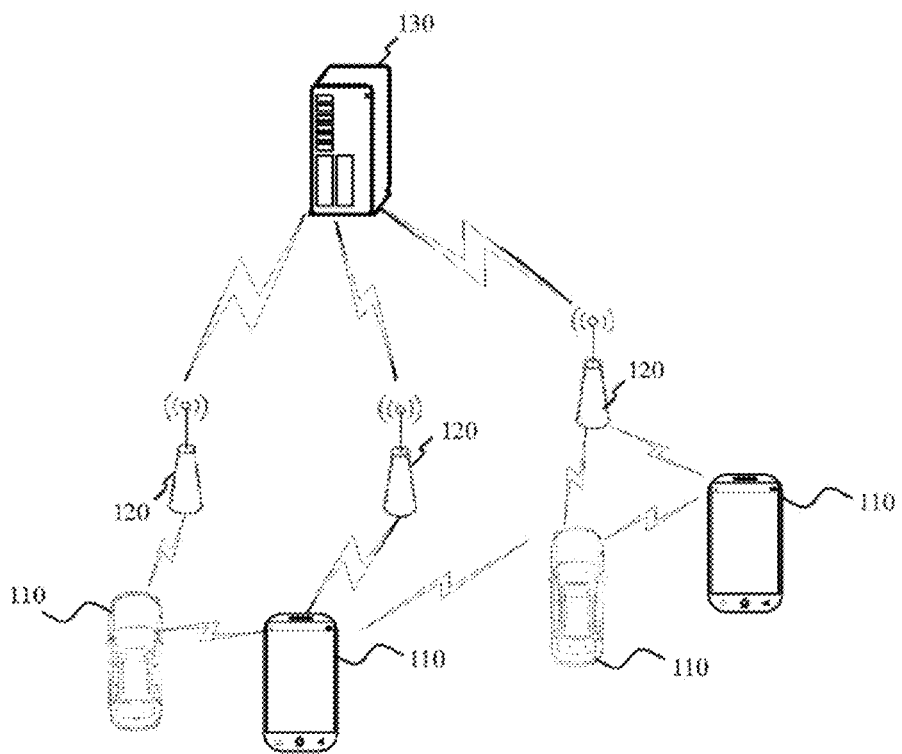
FIG. 1 is a schematic structural diagram of a radio communication system.

FIG. 1 shows a schematic structural diagram of a radio communication system according to an example the disclosure. As shown in FIG. 1, the radio communication system is a communication system based on cellular mobile communication. The radio communication system may include: a plurality of user equipment 110 and a plurality of base stations 120.

The user equipment 110 may be a device that provides voice and/or data connectivity to the user. The user equipment 110 may communicate with one or more core networks via a radio access network (RAN). The user equipment 110 may be an IoT user equipment, such as a sensor device, a mobile phone (or a "cellular" phone), and a computer having an IoT user equipment, which may be, for example, a fixed, portable, pocket-sized, handheld, computer-built or vehicle-mounted apparatus, for example, a station (STA), a subscriber unit, a subscriber station, a mobile station, a mobile, a remote station, an access point, remote terminal, an access terminal, a user terminal, a user agent, a user device, or a user equipment. Alternatively, the user equipment 110 may also be a device of an unmanned aerial vehicle. Alternatively, the user equipment 110 may also be a vehicle-mounted device, which may be, for example, a trip computer with a radio communication function, or a radio user equipment with an external trip computer. Alternatively, the user equipment 110 may also be a roadside device, which may be, for example, a street lamp, a signal lamp or other roadside devices with radio communication functions.

The base station 120 may be a network-side device in the radio communication system. The radio communication system may be the 4th generation mobile communication (4G) system, also known as a Long Term Evolution (LTE) system. Alternatively, the radio communication system may also be a 5G system, also known as a new air interface system or a 5G NR system. Alternatively, the radio communication system may also be the next generation system of the 5G system. The access network in the 5G system may be referred to as the new generation-radio access network (NG-RAN).

The base station 120 may be an evolved base station (eNB) used in the 4G system. Alternatively, the base station 120 may also be a base station with a CU-DU split architecture (gNB) in the 5G system. The base station 120 with a CU-DU split architecture usually includes a central unit (CU) and at least two distributed units (DUs). The PDCP is provided with the protocol stack of a Packet Data Convergence Protocol (PDCP) layer, a Radio Link Control (RLC) layer and a Medium Access Control (MAC) layer. The distributed unit is provided with the protocol stack of a physical (PHY) layer. The specific implementation of the base station 120 is not limited to the examples of the disclosure.

A radio connection may be established between the base station 120 and the user equipment 110 through radio air interfaces. In different implementations, the radio air interface is a radio air interface based on the 4th generation mobile communication (4G) standard. Alternatively, the radio air interface is a radio air interface based on the 5th generation mobile communication (5G) standard, for example, the radio air interface is a new air interface. Alternatively, the radio air interface may also be a radio air interface based on the next generation mobile communication standard of 5G.

In some examples, an E2E (End to End) connection may also be established between the user equipment 110, such as vehicle-to-vehicle (V2V) communication, vehicle-to-infrastructure (V2I) communication and vehicle-to-pedestrian (V2X) communication in vehicle-to-everything (V2X) communication.

Here, the user equipment described above may be considered as a terminal device in the examples below.

In some examples, the radio communication system may also include a network management device 130.

A plurality of base stations 120 are respectively connected to the network management device 130. The network management device 130 may be a core network device in the radio communication system. For example, the network management device 130 may be a mobility management entity (MME) in an evolved packet core (EPC). Alternatively, the network management device may also be other core network devices, such as a Serving GateWay (SGW), a Public Data Network GateWay (PGW) a Policy and Charging Rules Function (PCRF) or a Home Subscriber Server (HSS). The implementation form of the network management device 130 is not limited to the examples of the disclosure.

In the related art, for the beam-based downlink reception process, the base station indicates the transmission configuration indication (TCI) state of type D by signaling, and informs the user equipment of the reception beam to be used for reception. Each TCI state corresponds to one reference signal (RS) identifier, which may be a non zero power channel state information reference signal (NZP CSI-RS), or a synchronization signal block (SSB), or a sounding reference signal (SRS).

For the beam-based uplink transmission process, the base station indicates the transmission beam to be used for transmission by the user equipment through spatialrelationinfo. Each piece of spatialrelationinfo corresponds to one RS identifier, which may be a NZP CSI-RS, or an SSB or an SRS.

Figure 2:
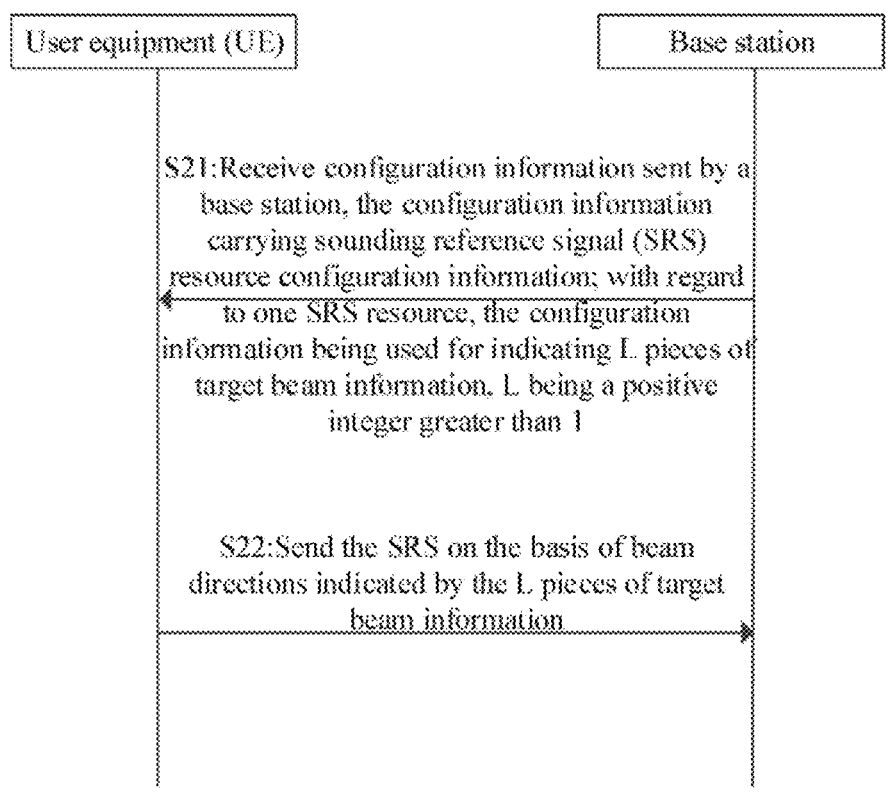
FIG. 2 is a flowchart of a data transmission processing method according to an example.

As shown in FIG. 2, provided is a data transmission processing method, applied to a user equipment (UE), including:

Step S21: configuration information sent by a base station is received, the configuration information carrying sounding reference signal (SRS) resource configuration information; with regard to one SRS resource, the configuration information is used for indicating L pieces of target beam information, L is a positive integer greater than 1; and Step S22: the SRS is sent in beam directions indicated by the L pieces of target beam information.

In the example of the disclosure, the user equipment (UE) may be a mobile phone, a computer, a server, a transceiving device, a tablet device, a medical device or a vehicle-mounted device, etc. The base station is an interface device for the user equipment to access the Internet. The base station may be various types of base stations, for example, a 3G base station, a 4G base station, a 5G or other evolved base station, or a vehicle-mounted device.

Here, the configuration information includes one or more pieces of configuration signaling.

For example, in air application scenario, the configuration information includes a piece of radio resource control (RRC) signaling. The RRC signaling indicates the L pieces of target beam information with regard to one SRS resource.

For another example, in another application scenario, the configuration information includes: a piece of RRC signaling and a piece of medium access control (MAC) signaling. The RRC signaling is configured with M pieces of beam information with regard to one SRS resource, and the MAC signaling activates and indicates the L pieces of target beam information in the M pieces of beam information. Here, L is less than M.

Here, the target beam information includes, but not limited to, one of the following:
spatialrelationinfo; and
a transmission configuration indication (TCI).

Here, the TCI includes an uplink TCI.

Here, the spatialrelationinfo and the uplink TCI are used for indicating a reference signal identifier in uplink transmission.

In some examples, each piece of target beam information is used for indicating the beam direction corresponding to one reference signal identifier.

Here, one piece of target beam information is used for indicating one reference signal identifier; and one reference signal identifier is used for indicating one beam direction.

For example, one piece of spatialrelationinfo is used for indicating the beam direction corresponding to one reference signal identifier. For another example, one uplink TCI is used for indicating the beam direction corresponding to one reference signal identifier. The uplink TCI here is used for indicating the uplink transmission beam direction of the SRS. When the reference signal is a downlink reference signal, for example, NZP CSI-RS or SSB, it means that the transmission beam direction of the SRS corresponds to the best reception beam direction when the terminal receives the NZP CSI-RS or SSB. When the reference signal is an uplink reference signal, for example, SRS, it means that the transmission beam direction of the SRS is the same as the transmission direction when the terminal transmits the SRS.

Here, the beam directions indicated by the L pieces of target beam information are beam directions corresponding to L reference signal identifiers indicated by the L pieces of target beam information. Here, the L pieces of target beam information are used for indicating L beam directions.

Here, the reference signal includes, but is not limited to, one of the following:
a non zero power channel state information reference signal (NZP CSI-RS);
a synchronization signal block (SSB); and
a sounding reference signal (SRS).

Here, the SRS includes, but not limited to, at least one of the following:
an SRS for channel state measurement;
SRS for beam measurement;
an SRS for antenna switching; and
an SRS for positioning.

Thus, according to the examples of the disclosure, the SRS for channel state measurement, beam measurement, and/or positioning can be sent in the different beam directions indicated by the L pieces of target beam information.

According to the example of the disclosure, the user equipment receives the configuration information sent by the base station, the configuration information carrying sounding reference signal (SRS) resource configuration information, with regard to one SRS resource, the configuration information is used for indicating L pieces of target beam information, L is a positive integer greater than 1; and sends the SRS in the beam directions indicated by the L pieces of target beam information.

In the examples of the disclosure, the UE, after receiving the configuration information once, can send the SRS by using the beam directions indicated by the L pieces of target beam information in the configuration information, which can reduce the configuration information of the beams, thus saving the system resources.

Moreover, according to the examples of the disclosure, the SRS can be sent on one SRS resource by using the beam directions indicated by the L pieces of target beam information, thus increasing a space gain of transmission on one SRS resource, and improving SRS transmission efficiency and success rate.

In some examples, the configuration information includes radio resource control (RRC) signaling. The RRC signaling indicates the L pieces of target beam information with regard to one SRS resource.

In an example, the L pieces of target beam information are indicated by one beam information indication field.

Here, the beam information indication field may be an indication field carried in the RRC, and the beam information indication field may be a spatialrelationinfo indication field or a transmission configuration indication (TCI) field. The beam information indication field occupies at least one bit.

For example, at least one bit of the RRC signaling carries the beam information indication field; and the beam information indication field indicates the L pieces of target beam information.

In an example, the beam information indication field is used for indicating L pieces of spatialrelationinfo. One piece of spatialrelationinfo is used for indicating the beam direction corresponding to one reference signal identifier.

In another example, the beam information indication field is used for indicating L TCIs. One TCI is used for indicating the beam direction corresponding to one reference signal identifier.

In the examples of the disclosure, if the L pieces of target beam information are directly indicated by the RRC signaling and no other signaling, such as MAC signaling or DCI signaling, is used for further indication, then the UE can send the SRS by directly using the beam directions indicated by the L pieces of target beam information. In this way, on the one hand, the space gain of transmission on one SRS resource can be increased, thus improving the SRS transmission efficiency; and on the other hand, the overhead of other signaling can be further reduced.

In other examples, the configuration information includes RRC signaling and MAC signaling. The RRC signaling is configured with M pieces of beam information with regard to one SRS resource, and the MAC signaling activates and indicates the L pieces of target beam information in the M pieces of beam information. M is a positive integer, and L is less than M.

In an example, the L pieces of target beam information are indicated by one beam information indication field.

Here, the beam information indication field may be carried in the MAC signaling. The MAC signaling is generated by the base station.

For example, at least one bit of the MAC signaling carries the beam information indication field, and the beam information indication field may be a spatialrelationinfo indication field or a transmission configuration indication field. The beam information indication field indicates the L pieces of target beam information.

In the examples of the disclosure, in the configuration information, first, the RRC signaling is configured with the M pieces of beam information, and then the MAC signaling activates the L pieces of target beam information in the M pieces of beam information.

In this way, the examples of the disclosure provide another method that selects L pieces of target beam information and sends the SRS in the beam directions indicated by the L pieces of target beam information. Moreover, there is no need to select all beam information in the M pieces of beam information configured for one SRS resource, and the beam direction indicated by some more suitable target beam information can be selected by MAC signaling for SRS transmission, thus further improving the SRS transmission efficiency.

In still other examples, the configuration information includes RRC signaling and downlink control indication (DCI) signaling. The RRC signaling is configured with M pieces of beam information with regard to one SRS resource, and the DCI signaling indicates the L pieces of target beam information in the M pieces of beam information. M is a positive integer, and L is less than M.

In an example, the L pieces of target beam information are indicated by one beam information indication field.

Here, the beam information indication field may be carried in the DCI signaling.

For example, at least one bit of the DCI signaling carries the beam information indication field, and the beam information indication field may be a spatialrelationinfo indication field or a transmission configuration indication field. The beam information indication field indicates the L pieces of target beam information.

In the examples of the disclosure, in the configuration information, first, the RRC signaling is configured with the M pieces of beam information, and then the DCI signaling indicates the L pieces of target beam information in the M pieces of beam information.

In this way, the examples of the disclosure provide another method that selects L pieces of target information beam information and sends the SRS in the beam directions indicated by the L pieces of target beam information. Moreover, there is no need to select all beam information in the M pieces of beans information configured for one SRS resource, and the beam direction indicated by some more suitable target beam information can be selected by DCI signaling for SRS transmission, thus further improving the SRS transmission efficiency.

In still other examples, the configuration information includes RRC signaling, MAC signaling and DCI signaling. The RRC signaling is configured with M pieces of beam information with regard to one SRS resource, the MAC signaling activates N pieces of candidate beam information in the M pieces of beam information, and the DCI signaling indicates the L pieces of target beam information in the N pieces of candidate beam information. M and N are positive integers, N is less than M, and L is less than N.

In an example, the pieces of target beam information are indicated by one beam information indication field.

Here, the beam information indication field may be carried in the MAC signaling and the DCI signaling, and the beam information indication field may be a spatialrelationinfo indication field or a transmission configuration indication field.

Here, the MAC signaling may select N pieces of candidate beam information from M pieces of beam information. The DCI signaling may select L pieces of target beam information from N pieces of candidate beam information.

In the examples of the disclosure, in the configuration information, first, the RRC signaling is configured with the M pieces of beam information, then the MAC signaling activates the N pieces of candidate beam information in the M pieces of beam information, and finally, the DCI signaling actually indicates the L pieces of target beam information in the N pieces of candidate beam information for SRS transmission.

In this way, the examples of the disclosure provide another method that selects L pieces of target beam information and sends the SRS in the beam directions indicated by the pieces of target beam information. Moreover, there is no need to use the beam directions indicated by all beam information configured for the SRS for the SRS transmission, and the beam directions indicated by the L pieces of target beam information can be selected, for example, L beam directions with better transmission effects can be selected, thus further improving the SRS transmission efficiency.

Figure 3:
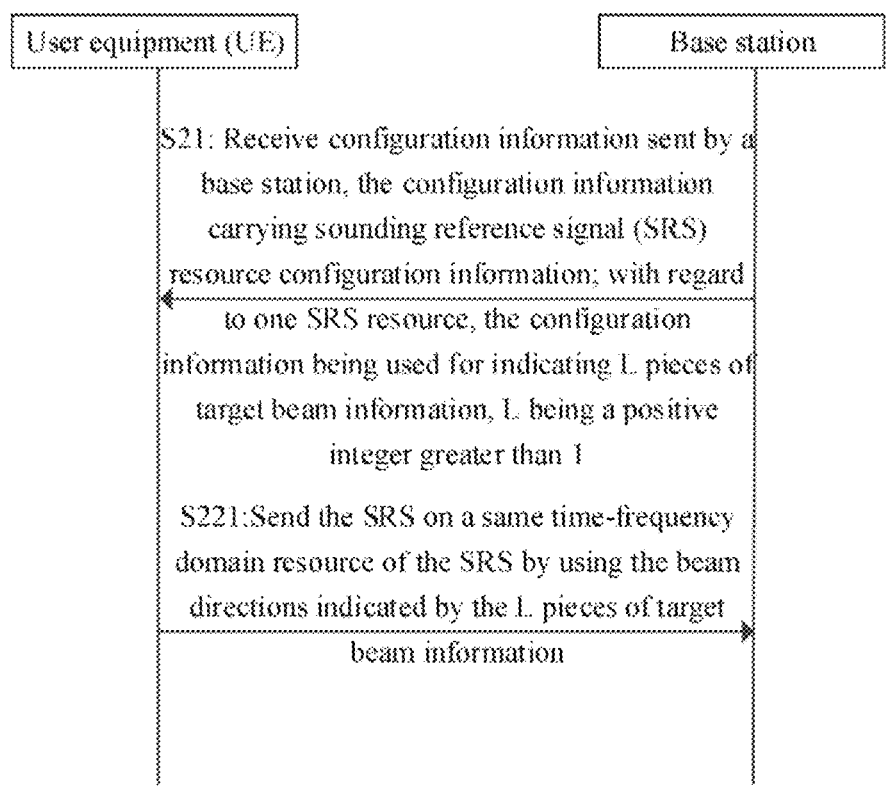
FIG. 3 is a flowchart of a data transmission processing method according to an example.

As shown in FIG. 3, in some examples, step S22 includes:

S221: the SRS is sent on a same time-frequency domain resource of the SRS using the beam directions indicated by the L pieces of target beam information.

For example, in an application scenario, the SRS has 1 time-frequency domain resource. There are 3 pieces of target beam information, and the beam directions indicated by the 3 pieces of target beam information are respectively Beam1, Beam2 and Beam3. Then, the UE sends the SRS on the 1 time-frequency domain resource by using Beam1, Beam2 and Beam3 at the same time.

For another example, in the above application scenario, if the SRS has 2 time-frequency domain resources, on both of the 2 frequency domain resources, the SRS is sent by using Beam1, Beam2 and Beam3.

In this way, in the examples of the disclosure, on one SRS time-frequency domain resource, the SRS is sent by using different beam directions, thus increasing the space gain of transmission on one SRS time-frequency domain resource, and improving the SRS transmission efficiency.

Figure 4:
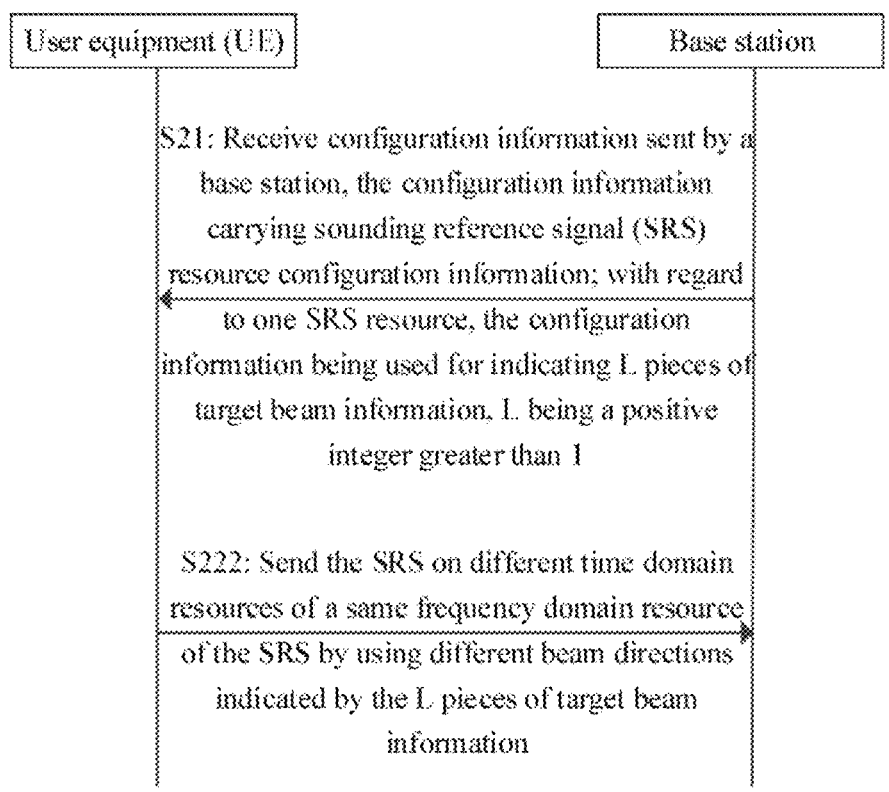
FIG. 4 is a flowchart of a data transmission processing method according to an example.

As shown in FIG. 4, in some examples, step S22 includes:

Step S222: the SRS is sent in different time domain resources of a same frequency domain resource of the SRS by using different beam directions indicated by the L pieces of target beam information.

Here, a time domain resource includes, but not limited to, one of the following: a slot, a mini-slot, or a symbol.

In some examples, step S222 includes:

Send the SRS on different sets of time domain resources of the same frequency domain resource of the SRS by using the different beam directions indicated by the L pieces of target beam information.

The set of time domain resources includes H consecutive time domain resources, H being a natural number.

In an example, the set of time domain resources includes one time domain resource. In another example, the set of time domain resources includes a plurality of consecutive time domain resources.

For example, in an application scenario, on the RB0 frequency domain resource, the time domain resource includes 6 consecutive slots, namely 1st slot, 2nd slot, 3rd slot, 4th slot, 5th slot and 6th slot.

If there are 6 pieces of target beam information and the beam directions indicated by the 6 pieces of target beam information are respectively Beam1, Beam2, Beam3, Beam4, Beam5 and Beam6, then the SRS may be sent in the 1st slot by using Beam1, the SRS may be sent in the 2nd slot by using Beam2, the SRS may be sent in the 3rd slot by using Beam3, the SRS may be sent in the 4th slot by using Beam4, the SRS may be sent in the 5th slot by using Beam5, and the SRS may be sent in the 6th slot by using Beam6.

If there are 3 pieces of target beam information and the beam directions indicated by the 3 pieces of target beam information are respectively Beam1, Beam2 and Beam3, then the SRS may be sent in the consecutive 1st and 2nd slots by using Beam1, the SRS may be sent in the consecutive 3rd and 4th slots by using Beam2 and the SRS may be sent in the consecutive 5th and 6th slots by using Beam3.

In this way, in the examples of the disclosure, the SRS is sent on different sets of time domain resources of the same frequency domain resource by using different beam directions. Thus, for different time periods, the beam direction with better transmission effect can be selected for SRS transmission, thus improving the SRS transmission efficiency.

Moreover, in the examples of the disclosure, the SRS may be sent on different time domain resources of the same frequency domain resource by using L beams, thus increasing the space gain of SRS transmission.

Figure 5:
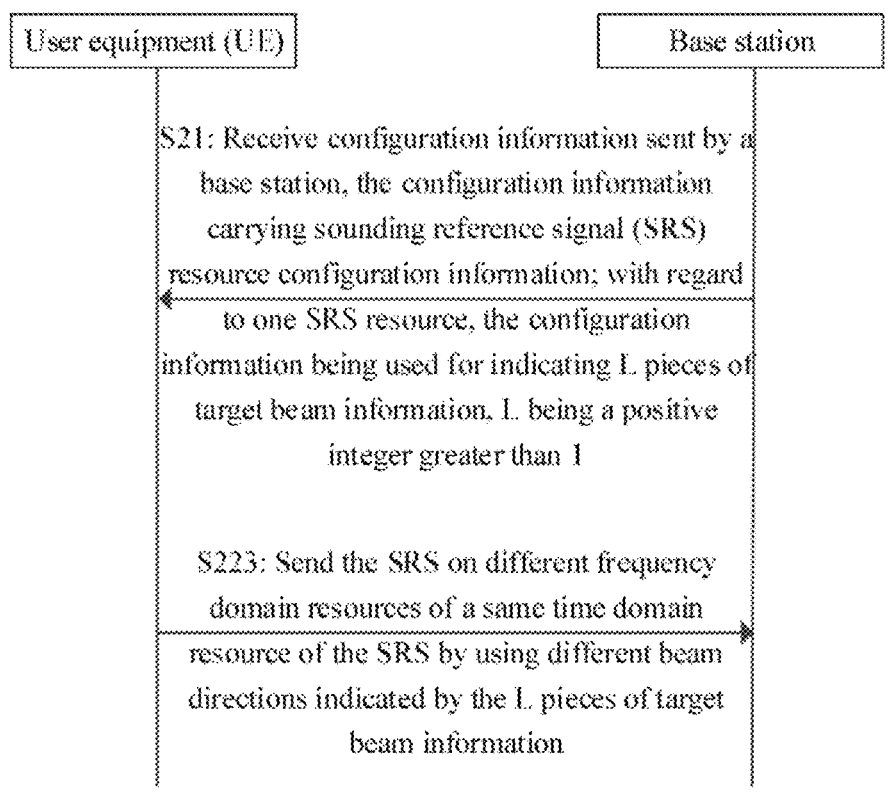
FIG. 5 is a flowchart of a data transmission processing method according to an example.

As shown in FIG. 5, in some examples, step S22 includes:

Step S223: the SRS is sent on different frequency domain resources of a same time domain resource of the SRS by using different beam directions indicated by the L pieces of target beam information.

In an example, a position of the frequency domain resource in the different frequency domain resources is: the position obtained by adding an offset to the position of the frequency domain resource in the SRS resource configuration information.

Here, a position of the next frequency domain resource in different frequency domain resources is: the position obtained by adding an offset to the position of the frequency domain resource in the SRS resource configuration information.

In an example, the offset includes one or more offsets, and each offset includes one or more resource blocks (RBS).

For example, in some application scenarios, on one time domain resource, there are 10 RB resources, namely RB1, RB2, RB3, RB4, RB5, RB6, RB7, RB8, RB9 and RB10. There are 2 pieces of target beam information, and the beam directions indicated by the 2 pieces of target beam information are Beam1 and Beam2.

If the position of the frequency domain resource in the SRS resource configuration information is RB1, RB4, and RB7 (i.e., the first frequency domain resource) and the offset is one RB, then the second frequency domain resource is RB2, R85 and RB8. Then, the UE may send the SRS on the first frequency domain resource by using Beam1, and send the SRS on the second frequency domain resource by using Beam2.

In some examples, the offset is obtained by receiving configuration signaling of the base station or acquired from a memory of the UE.

For example, in an example, the method further includes:
receive configuration signaling sent by the base station, the configuration signaling carrying the value of the offset. In this way, in the examples of the disclosure, the UE may acquire the offset in the configuration signaling sent by the base station. Thus, the UE may obtain the offset of the frequency domain resource in the indication of the base station.

For another example, in another example, the method further includes:
acquire the offset from a storage resource stored in the UE. In this way, the offset may also be acquired from the local storage resource of the UE.

In the examples of the disclosure, the UE may send the SRS on different frequency domain resources of the same time domain resource by using the beam directions corresponding to the frequency domain resources. Thus, the UE may send the SRS on the frequency domain resources by using the beam direction with better transmission effect, thus improving the SRS transmission efficiency.

Moreover, in the examples of the disclosure, the SRS may be sent in different frequency domain resources of the same time domain resource by using L beams, thus increasing the frequency domain gain and space gain of SRS transmission.

In some examples, the target beam information is also used for indicating one or more of an antenna panel index, a transmission reception point index or a physical cell identifier corresponding one reference signal identifier.

Here, the physical cell identifier includes: a physical cell identifier of the serving cell of the UE, or a physical cell identifier of a neighbor cell.

Here, the antenna panel index includes at least one of the following:
  a reference signal index corresponding to the antenna panel;
  a reference signal set index corresponding to the antenna panel; and
  a control resource set pool index corresponding to the antenna panel.

In the examples of the disclosure, when the target beam information is used for indicating a physical cell corresponding to the reference signal identifier, the SRS can be sent to different physical cells by using different beam directions. Alternatively, when the target beam information is used for indicating a transmission reception point corresponding to the reference signal identifier, the SRS can be sent to different transmission reception points by using different beam directions. Alternatively, the SRS can be sent to different antenna panels by using different beam directions.

In this way, in the examples of the disclosure, the SRS can be sent in different directions, thus increasing the space gain of transmission on one SRS time-frequency domain resource, and improving the SRS transmission efficiency.

It is to be noted here that the data transmission processing method below is applied to a base station, and is similar to the description of the data transmission processing method applied to the user equipment above. For technical details not disclosed in the examples of the data transmission processing method applied to the base station in the disclosure, reference can be made to the description of the examples of the data transmission processing method applied to the user equipment in the disclosure, which will not be described in detail here.

Figure 6:
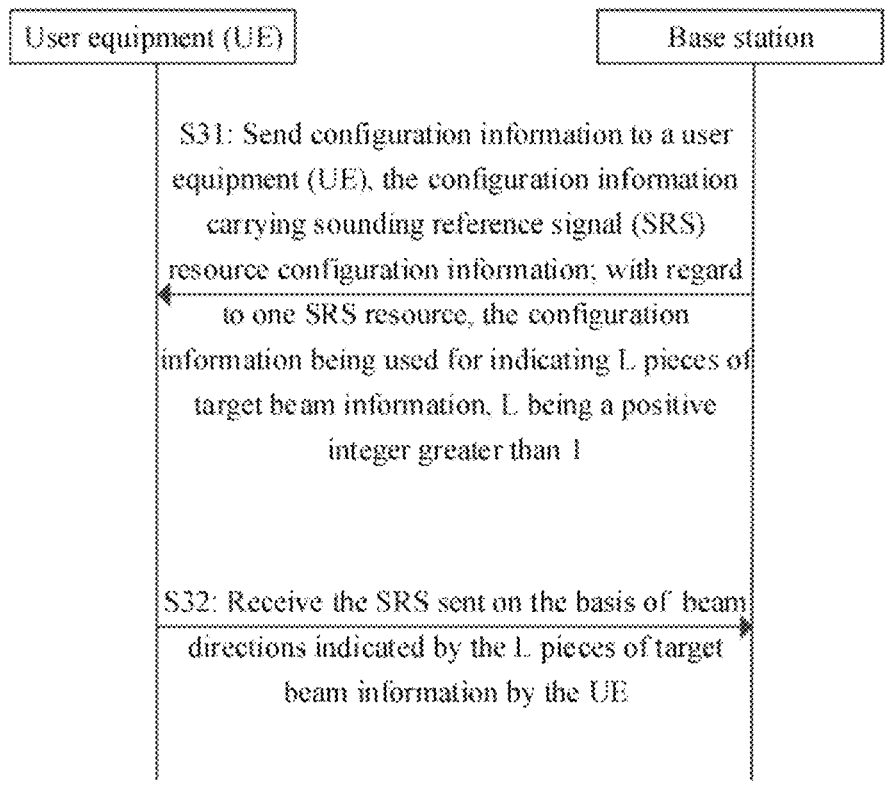
FIG. 6 is a flowchart of a data transmission processing method according to an example.

As shown in FIG. 6, provided is a data transmission processing method, applied to a base station, including:

Step S31: configuration information is sent to a user equipment (UE), the configuration information carrying sounding reference signal (SRS) resource configuration information; with regard to one SRS resource, the configuration information being used for indicating L pieces of target beam information, L being a positive integer greater than 1; and Step S32: the SRS sent by the UE is received in beam directions indicated by the L pieces of target beam information.

In some examples, each piece of target beam information is used for indicating the beam direction corresponding to one reference signal identifier.

In some examples, step S32 includes:
  receive the SRS sent by the UE on the same time-frequency domain resource of the SRS by using the beam directions indicated by the L pieces of target beam information.

In some examples, step S32 includes:
  receive the SRS sent by the UE on different time domain resources of the same frequency domain resource of the SRS by using the different beam directions indicated by the L pieces of target beam information.

In some examples, receiving the SRS sent by the UE on different time domain resources of the same frequency domain resource of the SRS by using the different beam directions indicated by the L pieces of target beam information includes:
  receive the SRS sent by the UE on different sets of time domain resources of the same frequency domain resource of the SRS by using the different beam directions indicated by the L pieces of target beam information.

The set of time domain resources includes H consecutive time domain resources, H being a natural number.

In some examples, step S32 includes:
  receive the SRS sent by the UE on different sets of frequency domain resources of the same time domain resource of the SRS by using the different beam directions indicated by the L pieces of target beam information.

In some examples, a position of the frequency domain resource in the different frequency domain resources is: the position obtained by adding an offset to the position of the frequency domain resource in the SRS resource configuration information.

The offset is obtained by receiving configuration signaling of the base station or acquired from a memory of the UE.

In some examples, the configuration information includes radio resource control (RRC) signaling. The RRC signaling is configured with the L pieces of target beam information with regard to one SRS resource.

In some examples, the configuration information includes RRC signaling and medium access control (MAC) signaling. The RRC signaling is configured with M pieces of beam information with regard to one SRS resource, and the MAC signaling activates and indicates the L pieces of target beam information in the M pieces of beam information. M is a positive integer, and L is less than M.

In some examples, the configuration information includes RRC signaling and downlink control indication (DCI) signaling. The RRC signaling is configured with M pieces of beam information with regard to one SRS resource, and the DCI signaling indicates the L pieces of target beam information in the M pieces of beam information. M is a positive integer, and L is less than M.

In some examples, the configuration information includes RRC signaling, MAC signaling and DCI signaling. The RRC signaling is configured with M pieces of beam information with regard to one SRS resource, the MAC signaling activates N pieces of candidate beam information in the M pieces of beam information, and the DCI signaling indicates the L pieces of target beam information in the N pieces of candidate beam information M and N are positive integers, N is less than M, and L is less than N.

In some examples, the L pieces of target beam information are indicated by one beam information indication field.

In some examples, the target beam information is also used for indicating one or more of an antenna panel index, a transmission reception point index or a physical cell identifier corresponding to one reference signal identifier.

In some examples, the reference signal includes, but not limited to, one of the following:
  a non zero power channel state information reference signal (NZP CSI-RS);
  a synchronization signal block (SSB); and
  a sounding reference signal (SRS).

In some examples, the SRS includes, but not limited to, at least one of the following:
  an SRS for channel state measurement,
  an SRS for beam measurement;
  an SRS for antenna switching; and
  an SRS for positioning.

Figure 7:
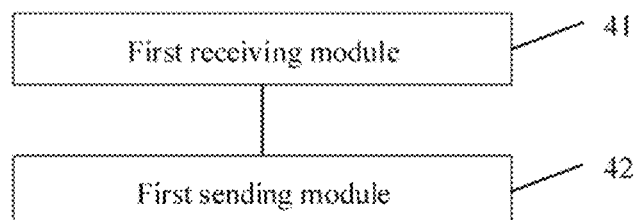
FIG. 7 is a block diagram of a data transmission processing apparatus according to an example.

As shown in FIG. 7, provided is a data transmission processing apparatus, applied to a user equipment (UE), including:
  a first receiving module 41, configured to receive configuration information sent by a base station, the configuration information carrying sounding reference signal (SRS) resource configuration information; with regard to one SRS resource, the configuration information being used for indicating L pieces of target beam information, L being a positive integer greater than 1; and
  a first sending module 42, configured to send the SRS in beam directions indicated by the L pieces of target beam information.

In some examples, each piece of target beam information is used for indicating the beam direction corresponding to one reference signal identifier.

In some examples, the first sending module 42 is configured to send the SRS on a same time-frequency domain resource of the SRS by using the beam directions indicated by the L pieces of target beam information.

In some examples, the first sending module 42 is configured to send the SRS on different time domain resources of a same frequency domain resource of the SRS by using different beam directions indicated by the L pieces of target beam information.

In some examples, the first ending module 42 is configured to send the SRS on different sets of time domain resources of the same frequency domain resource of the SRS by using the different beam directions indicated by the L pieces of target beam information.

The set of time domain resource includes H consecutive time domain resources, H being a natural number.

In some examples, the first sending module 42 is configured to send the SRS on different frequency domain resources of a same time domain resource of the SRS by using different beam directions indicated by the L pieces of target beam information.

In some examples, a position of the frequency domain resource in the different frequency domain resources is: the position obtained by adding an offset to the position of the frequency domain resource in the SRS resource configuration information.

The offset is obtained by receiving configuration signaling of the base station or acquired from a memory of the UE.

In some examples, the configuration information includes radio resource control (RRC) signaling. The RRC signaling indicates the L pieces of target beam information with regard to one SRS resource.

In some examples, the configuration information includes RRC signaling and medium access control (MAC) signaling. The RRC signaling is configured with M pieces of beam information with regard to one SRS resource, and the MAC signaling activates and indicates the L pieces of target beam formation in the M pieces of beam information. M is a positive integer, and L is less than M.

In some examples, the configuration information includes RRC signaling and downlink control indication (DCI) signaling. The RRC signaling is configured with M pieces of beam information with regard to one SRS resource, and the DCI signaling indicates the L pieces of target beam information in the M pieces of beam information. M is a positive integer, and L is less than M.

In some examples, the configuration information includes RRC signaling, MAC signaling and DCI signaling. The RRC signaling is configured with M pieces of beam information with regard to one SRS resource, the MAC signaling activates N pieces of candidate beam information in the M pieces of beam information, and the DCI signaling indicates the L pieces of target beam information in the N pieces of candidate beam information. M and N are positive integers, N is less than M, and L is less than N.

In some examples, the L pieces of target beam information are indicated by one beam information indication field.

In some examples, the target beam information is also used for indicating one or more of an antenna panel index, a transmission reception point index or a physical cell identifier corresponding to one reference signal identifier.

In some examples, the reference signal includes, but not limited to, one of the following:
- a non zero power channel state information reference signal (NZP CSI-RS);
- a synchronization signal block (SSB); and
- a sounding reference signal (SRS).

In some examples, the SRS includes, but not limited to, at least one of the following:
- an SRS for channel state measurement;
- an SRS for beam measurement;
- an SRS for antenna switching; and
- an SRS for positioning.

Figure 8:
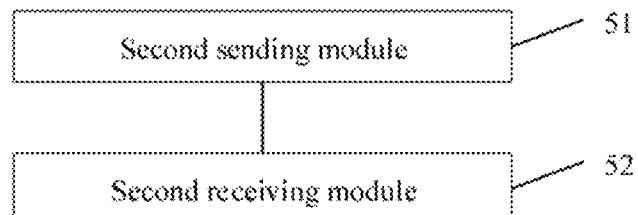
FIG. 8 is a block diagram of a data transmission processing apparatus according to an example.

As shown in FIG. 8, provided is a data transmission processing apparatus, applied to a base station, including:
- a second sending module 51, configured to send configuration information to a user equipment (UE), the configuration information carrying sounding reference signal (SRS) resource configuration information; with regard to one SRS resource, the configuration information is used for indicating L pieces of target beam information, L is a positive integer greater than 1; and
- a second receiving module 52, configured to receive the SRS sent by the UE in beam directions indicated by the L pieces of target beam information.

In some examples, each piece of target beam information is used for indicating the beam direction corresponding to one reference signal identifier.

In some examples, the second receiving module 52 is configured to receive the SRS sent by the UE on the same time-frequency domain resource of the SRS by using the beam directions indicated by the L pieces of target beam information.

In some examples, the second receiving module 52 is configured to receive the SRS sent by the UE on different time domain resources of the same frequency domain resource of the SRS by using the different beam directions indicated by the L pieces of target beam information.

In some examples, the second receiving module 52 is configured to receive the SRS sent by the UE on different sets of time domain resources of the same frequency domain resource of the SRS by using the different beam directions indicated by the L pieces of target beam information.

The set of time domain resources includes H consecutive time domain resources, H being a natural number.

In some examples, the second receiving module 52 is configured to receive the SRS sent by the UE on different sets of frequency domain resources of the same time domain resource of the SRS by using the different beam directions indicated by the L pieces of target beam information.

In some examples, a position of the frequency domain resource in the different frequency domain resources is: the position obtained by adding an offset to the position of the frequency domain resource in the SRS resource configuration information.

The offset is obtained by receiving configuration signaling of the base station or acquired from a memory of the UE.

In some examples, the configuration information includes radio resource control (RRC) signaling. The RRC signaling is configured with the L pieces of target beam information with regard to one SRS resource.

In some examples, the configuration information includes RRC signaling and medium access control (MAC) signaling. The RRC signaling is configured with M pieces of beam information with regard to one SRS resource, and the MAC signaling activates and indicates the L pieces of target beam information in the M pieces of beam information. M is a positive integer, and L is less than M.

In some examples, the configuration information includes RRC signaling and downlink control indication (DCI) signaling. The RRC signaling is configured with M pieces of beam information with regard to one SRS resource, and the DCI signaling indicates the L pieces of target beam information in the M pieces of beam information. M is a positive integer, and L is less than M.

In some examples, the configuration information includes RRC signaling, MAC signaling and DCI signaling. The RRC signaling is configured with M pieces of beam information with regard to one SRS resource, the MAC signaling activates N pieces of candidate beam information in the M pieces of beam information, and the DCI signaling indicates the L pieces of target beam information in the N pieces of candidate beam information. M and N are positive integers, N is less than M, and L is less than N.

In some examples, the L pieces of target beam information are indicated by one beam information indication field.

In some examples, the target beam information is also used for indicating one or more of an antenna panel index, a transmission reception point index or a physical cell identifier corresponding to one reference signal identifier.

In some examples, the reference signal includes, but not limited to, one of the following:
- a non zero power channel state information reference signal (NZP CSI-RS);
- a synchronization signal block (SSB); and
- a sounding reference signal (SRS).

In some examples, the SRS includes, but not limited to, at least one of the following:
- an SRS for channel state measurement;
- an SRS for beam measurement;
- an SRS for antenna switching; and
- an SRS for positioning.

For the apparatus in the above examples, the specific manner in which each module executes the operation has been described in detail in the examples related to the method, and the detailed description will not be given here.

An example of the disclosure provides a communication device, including:
- a processor; and
- a memory for storing a processor executable instruction.

The processor is configured to implement the data transmission processing method according to any example of the disclosure when executing the executable instruction.

Here, the communication device includes: a base station or a user equipment.

The processor may include various types of storage media, which are non-temporary computer storage media capable of continuing to remember the information stored on the storage media after the communication device is powered off.

The processor may be connected to the memory through a bus or the like, to read the executable program stored on the memory, for example, at least one of the methods shown in FIG. 2 to FIG. 6.

The memory is configured to store various types of data to support operations at the communication device. Examples of these data include instructions for any application or method operating on the communication device, contact data, phone book data, messages, pictures, videos and the like. The memory may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

An example of the disclosure further provides a computer storage medium. The computer storage medium stores a computer executable program. The executable program implements the data transmission processing method according to any example of the disclosure when being executed by a processor, for example, at least one of the methods shown in FIG. 2 to FIG. 6.

The non-transitory computer-readable storage medium may be an ROM, a random access memory (RAM), a CD-ROM, a magnetic tape, a floppy disk, an optical data storage device, or the like.

For the apparatus in the above examples, the specific manner in which each module executes the operation has been described in detail in the examples related to the method, and the detailed description will not be given here.

Figure 9:
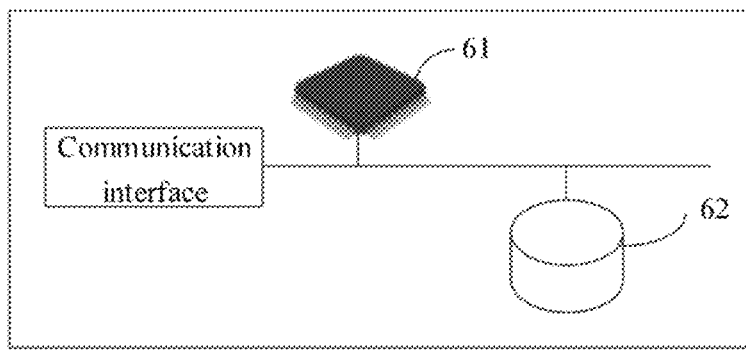
FIG. 9 is a block diagram of a user equipment according to an example.

FIG. 9 is a block diagram of a user equipment according to an example. For example, the user equipment may be a mobile phone, a computer, a digital broadcasting user equipment, a message transceiving device, a game console, a tablet device, a medical device, a fitness device, a personal digital assistant or the like.

Referring to FIG. 9, the user equipment includes: a processor 61 and a memory 62 for storing a processor 61 executable instruction.

The processor 61 is configured to implement the data transmission processing method applied to the user equipment in the disclosure when executing the executable instruction.

Figure 10:
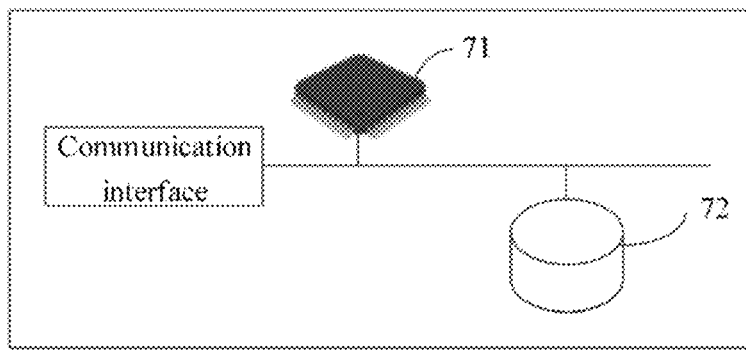
FIG. 10 is a block diagram of a base station according to an example.

As shown in FIG. 10, an example of the disclosure shows a block diagram of a base station. For example, the base station may be provided as a network-side device.

Referring to FIG. 10, the base station 900 includes: a processor 71 and a memory 72 for storing a processor 71 executable instruction.

The processor 71 is configured to implement the data transmission processing method applied to the base station in the disclosure when executing the executable instruction.

Those skilled in the art will easily think of other implementations of the disclosure after considering the specification and practicing the invention disclosed here. The disclosure is intended to cover any variations, uses or adaptations of the disclosure. These variations, uses, or adaptations follow the general principles of the disclosure and include common knowledge or conventional technical means in the technical field that is not disclosed in the disclosure. The specification and the examples are only to be regarded as exemplary, and the true scope and spirit of the disclosure are pointed out by the claims below.

It is to be understood that the disclosure is not limited to the precise structure that has been described above and shown in the accompanying drawings, and various modifications and changes can be made without departing from its scope. The scope of the disclosure is only limited by the appended claims.

What is claimed is:

1. A data transmission processing method, applied to a user equipment (UE), comprising:
   receiving configuration information sent by a base station, wherein the configuration information carries sounding reference signal (SRS) resource configuration information and for one SRS resource, the configuration information is used for indicating L pieces of target beam information, wherein L being a positive integer greater than 1 and the target beam information includes at least one of spatialrelationinfo and an uplink transmission configuration indication (TCI); and
   sending the SRS in beam directions indicated by the L pieces of target beam information, which comprises:
   sending the SRS on different frequency domain resources within a same time domain resource of the SRS, with each of the of the different frequency domain resources using a different beam direction indicated by the L pieces of target beam information, wherein the different frequency domain resources indicates a position of the frequency domain resource obtained by adding an offset to the position of the frequency domain resource in the SRS resource configuration information.

2. The data transmission processing method according to claim 1, wherein each piece of target beam information is used for indicating a beam direction corresponding to one reference signal identifier.

3. The data transmission processing method according to claim 2, wherein the target beam information is used for indicating at least one of an antenna panel index, a transmission reception point index or a physical cell identifier corresponding to one reference signal identifier.

4. The data transmission processing method according to claim 2, wherein the reference signal comprises one of:
   a non zero power channel state information reference signal (NZP CSI-RS);
   a synchronization signal block (SSB); or
   a sounding reference signal (SRS).

5. The data transmission processing method according to claim 1, wherein the offset is obtained by receiving configuration signaling of the base station or acquired from a memory of the UE.

6. The data transmission processing method according to claim 1, wherein the configuration information is carried in a radio resource control (RRC) signaling, the RRC signaling indicating the L pieces of target beam information with regard to one SRS resource.

7. The data transmission processing method according to claim 1, wherein the configuration information is carried in RRC signaling and medium access control (MAC) signaling, the RRC signaling is configured with M pieces of beam information with regard to one SRS resource, and the MAC signaling activates the L pieces of target beam information in the M pieces of beam information; M being a positive integer, and L being less than M.

8. The data transmission processing method according to claim 1, wherein the configuration information is carried in RRC signaling and downlink control indication (DCI) signaling, the RRC signaling is configured with M pieces of beam information with regard to one SRS resource; and the DCI signaling indicates the L pieces of target beam information in the M pieces of beam information, M being a positive integer, and L being less than M.

9. The data transmission processing method according to claim 1, wherein the configuration information is carried in RRC signaling, MAC signaling and DCI signaling, the RRC signaling is configured with M pieces of beam information with regard to one SRS resource; the MAC signaling activates N pieces of candidate beam information in the M pieces of beam information, and the DCI signaling indicates the L pieces of target beam information in the N pieces of candidate beam information, M and N being positive integers, N being less than M, and L being less than N.

10. The data transmission processing method according to claim 1, wherein the L pieces of target beam information are indicated in one beam information indication field.

11. The data transmission processing method according to claim 1, wherein the SRS comprises at least one of:
an SRS for channel state measurement;
an SRS for beam measurement;
an SRS for antenna switching; or
an SRS for positioning.

12. A data transmission processing method, applied to a base station, comprising:
sending configuration information to a user equipment (UE), wherein the configuration information carries sounding reference signal (SRS) resource configuration information and for one SRS resource, the configuration information being used for indicating L pieces of target beam information, wherein L being a positive integer greater than 1 and the target beam information includes at least one of spatialrelationinfo and an uplink transmission configuration indication (TCI); and
receiving the SRS sent in beam directions indicated by the L pieces of target beam information by the UE, and
wherein the SRS is sent on different frequency domain resources within a single time domain resource, and each of the different frequency domain resources uses a different beam direction indicated by the L pieces of target beam information, the different frequency domain resources indicates a position of the frequency domain resource obtained by adding an offset to the position of the frequency domain resource in the SRS resource configuration information.

13. The data transmission processing method according to claim 12, wherein each piece of target beam information is used for indicating a beam direction corresponding to one reference signal identifier;
the target beam information is used for indicating at least one of an antenna panel index, a transmission reception point index or a physical cell identifier corresponding to one reference signal identifier.

14. The data transmission processing method according to claim 12, wherein the configuration information is carried in radio resource control (RRC) signaling, the RRC signaling indicating the L pieces of target beam information with regard to one SRS resource.

15. The data transmission processing method according to claim 12, wherein the configuration information is carried in RRC signaling and medium access control (MAC) signaling, the RRC signaling is configured with M pieces of beam information with regard to one SRS resource; and the MAC signaling activates the L pieces of target beam information in the M pieces of beam information; M being a positive integer, and L being less than M.

16. The data transmission processing method according to claim 12, wherein the configuration information is carried in RRC signaling and downlink control indication (DCI) signaling, the RRC signaling is configured with M pieces of beam information with regard to one SRS resource; and the DCI signaling indicates the L pieces of target beam information in the M pieces of beam information; M being a positive integer, and L being less than M.

17. The data transmission processing method according to claim 12, wherein the configuration information is carried in RRC signaling, MAC signaling and DCI signaling, the RRC signaling is configured with M pieces of beam information with regard to one SRS resource, the MAC signaling activates N pieces of candidate beam information in the M pieces of beam information, and the DCI signaling indicates the L pieces of target beam information in the N pieces of candidate beam information, M and N being positive integers, N being less than M, and L being less than N.

18. The data transmission processing method according to claim 12, wherein the L pieces of target beam information are indicated in one beam information indication field.

19. A communication device, comprising:
a processor; and
a memory for storing a processor executable instruction, and
wherein the processor is configured to execute the instruction to implement the data transmission method according to claim 12.

20. A communication device, comprising:
a processor; and
a memory for storing a processor executable instruction, wherein the processor executable instruction when executed by the processor cause the processor to:
receive configuration information sent by a base station, wherein the configuration information carries sounding reference signal (SRS) resource configuration information and for one SRS resource, the configuration information is used for indicating L pieces of target beam information, L being a positive integer greater than 1, wherein the target beam information includes at least one of spatialrelationinfo and an uplink transmission configuration indication (TCI); and
send the SRS in beam directions indicated by the L pieces of target beam information, which comprises:
sending the SRS on different frequency domain resources within a same time domain resource of the SRS, with each of the of the different frequency domain resources using a different beam direction indicated by the L pieces of target beam information, wherein the different frequency domain resources indicates a position of the frequency domain resource obtained by adding an offset to the position of the frequency domain resource in the SRS resource configuration information.

* * * * *